United States Patent [19]

Mitchell

[11] 4,008,778
[45] Feb. 22, 1977

[54] SELF POWERED JACK CARRIAGE FOR MOVING DISABLED VEHICLES

[76] Inventor: Lowell V. Mitchell, 11263 Burbank Blvd., North Hollywood, Calif. 91601

[22] Filed: Nov. 10, 1975

[21] Appl. No.: 630,401

[52] U.S. Cl. ............................. 180/6.5; 180/19 H; 254/8 B
[51] Int. Cl.² ........................................ B62D 11/04
[58] Field of Search ............... 180/6.5, 19 H, 19 S, 180/19 R; 254/2 B, 8 B

[56] References Cited

UNITED STATES PATENTS

| | | | |
|---|---|---|---|
| 2,254,055 | 8/1941 | Wolf | 254/2 B |
| 2,543,308 | 2/1951 | Wolf | 254/2 B |
| 2,725,946 | 12/1955 | Welter | 180/19 R |
| 3,321,180 | 5/1967 | Hutchinson | 180/6.5 X |
| 3,340,941 | 9/1967 | Neu | 180/6.5 |
| 3,417,833 | 12/1968 | McRae | 180/19 R |
| 3,924,701 | 12/1975 | Johnstone | 180/6.5 |

Primary Examiner—Philip Goodman
Assistant Examiner—John A. Pekar
Attorney, Agent, or Firm—Gerald L. Price

[57] ABSTRACT

A self powered carriage which receives a conventional hydraulic floor jack to enable a disabled and immobile automobile to be moved and selectively manuvered. The carriage receives a conventional hydraulic floor jack in a manner whereby the load bearing wheels of the jack are elevated and immobilized and in their place, a pair of independently controlled powered wheels on the carriage are utilized which, once an immobilized vehicle is elevated by the jack, the vehicle can be moved in a desired direction by selectively operating the powered wheels.

6 Claims, 5 Drawing Figures

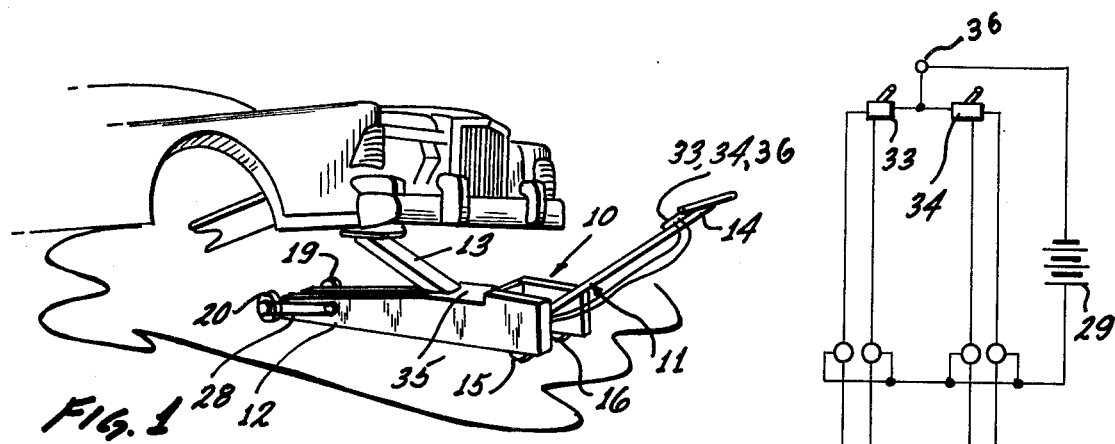
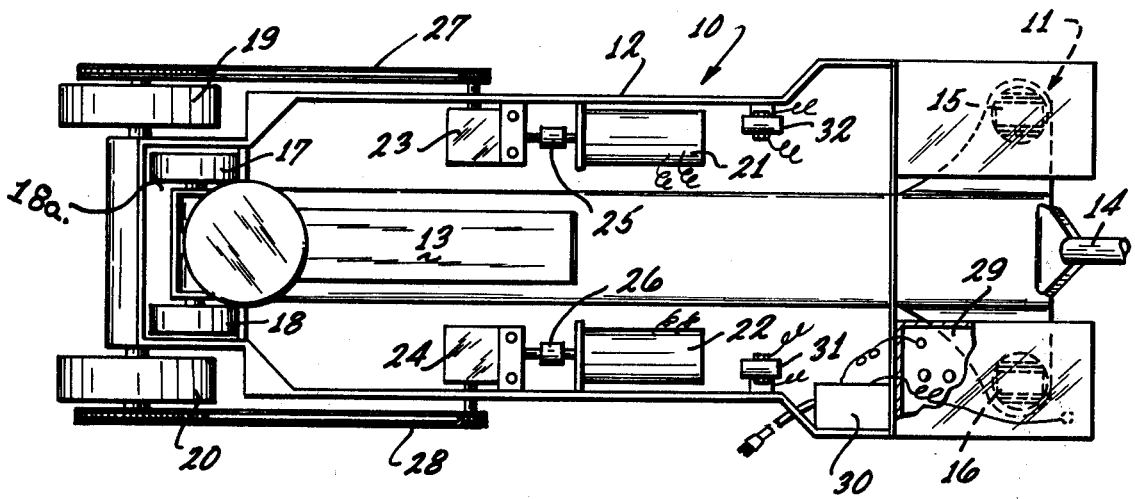
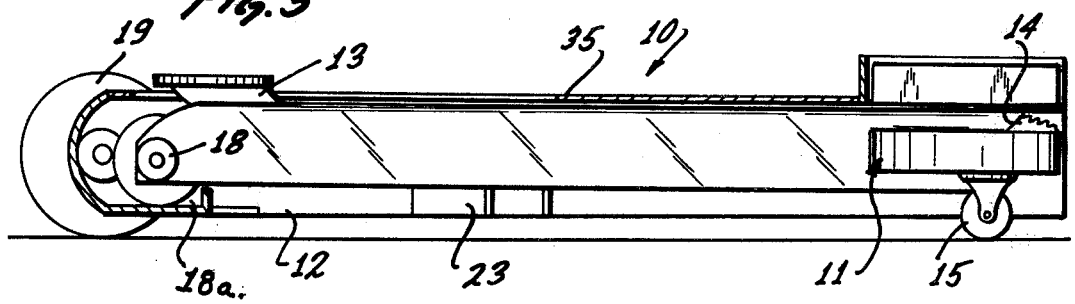
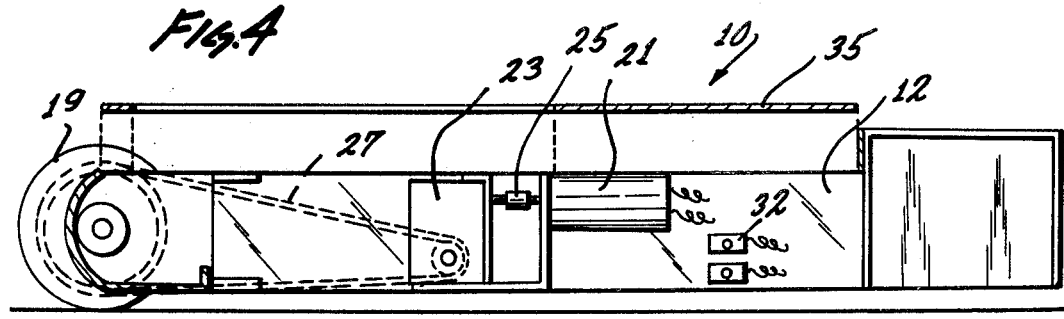

SELF POWERED JACK CARRIAGE FOR MOVING DISABLED VEHICLES

BACKGROUND OF THE INVENTION

The present invention relates generally to apparatus for elevating and moving disabled vehicles, and more particularly, to a new and improved self powered and steerable carriage which receives and supports a conventional hydraulic floor jack which enables a disabled and immobile vehicle to be readily elevated and moved.

One problem often encountered when working on damaged or disabled vehicles that cannot be readily rolled or steered, is moving such an immobile vehicle around the repair facility to a desired location. While there are wheeled floor jacks available which enable a disabled vehicle to be moved and manuvered once it is elevated, to do so usually requires the efforts of several people and takes considerable time. With the high cost of skilled automobile mechanics, each time that a group of mechanics are called away from their respective work to help push and manuver a vehicle supported on a wheeled floor jack, a substantial expense is incurred.

SUMMARY OF THE INVENTION

Accordingly, it is the general aim of the present invention to provide a new and improved self powered and steerable carriage for receiving and supporting a conventional wheeled hydraulic floor jack so that a damaged or diabled vehicle that is immobile can be readily raised and moved to a desired location without effort and by a single operator.

It is another object of the present invention to provide a self powered and steerable floor jack and carriage combination that is completely self contained, in which servicing and maintenance operations are held to a minimum and which can be readily operated without extensive instruction or experience.

BRIEF DESCRIPTION OF THE DRAWINGS:

The above stated and other objects and advantages of the instant invention will readily appear from the following description taken in conjunction with the accompanying drawings in which:

FIG. 1 is a perspective view of an exemplary self powered and steerable carriage embodying the features of the present invention and here showing the carriage provided with a wheeled hydraulic floor jack that has elevated an immobile vehicle;

FIG. 2 is a top view of the exemplary carriage depicted in FIG. 1, with the cover plate removed;

FIG. 3 is a side elevation in section showing the mounting of a conventional wheeled hydraulic floor jack in the exemplary carriage depicted in FIG. 1;

FIG. 4 is a side elevation in section similar to that of FIG. 3 but with the jack removed;

FIG. 5 is a schematic diagram of the electrical circuitry of the present invention.

While the present invention is susceptible of various modifications and alternative constructions, the illustrative embodiment shown in the drawings will herein be described in detail. It should be understood, however, that it is not intended to limit the invention to the particular forms disclosed, but, on the contrary, the intention is to cover all modifications, equivalents, and alternative constructions falling within the spirit and scope of the invention as expressed in the appended claims.

DESCRIPTION OF THE PREFERRED EMBODIMENT:

Referring now to FIGS. 1 and 2, an exemplary carriage, generally indicated at 10, is illustrated with a wheeled hydraulic floor jack mounted and carried on the frame 12 of the carriage. The jack 11, is of a typical construction having a lifting arm 13, a control handle 14, and a rearward pair of caster type wheels 15 and 16 for steering, and a forward pair of load bearing wheels 17 and 18.

In order to both support and immobilize the load bearing wheels 17 and 18 of the jack 11 and to mount the jack 11 on the carriage 10, the frame 12 of the carriage as shown in FIGS. 2 and 3 is provided with a recess 18a which permits the jack 11 to be nested within the frame 12 of the carriage with its forward load bearing wheels 17 and 18 supported in an elevated and restrained position and its rearward steerable wheels 15 and 16 engaging the ground and supporting the rearward portion of the frame 12 of the carriage 10.

In accordance with one of the important aspects of the present invention, the heavy duty wheels 19 and 20 are provided at the forward end of the carriage frame 12 which are individually powered by electric motors 21 and 22 respectively. As shown in FIGS. 2 and 4, the motors 21 and 22, which are preferably high torque direct current electric motors, dirve their respective wheels through a drive train consisting of a pair of right angle gear boxes 23 and 24 each coupled to their respective motors by shafts 25 and 26, which are preferably provided with torque limiting or absorbing couplings. The right angle gear boxes 23 and 24 are connected to their respective wheels 19 and 20 by chain and sprocket drives 27 and 28.

In order to be able to selectively move and steer the carriage 10 when provided with a jack 11 as depicted in FIGS. 1 through 3, the motors 21 and 22 which are powered by battery 29, each motor is controlled by a triple throw-triple pole switches, 33 and 34 respectively, which are located on the control handle of the jack 14. Each of the switches 33 and 34 are capable of placing their respective motor in a forward, off or reverse mode. Due to the high amperage of the system which is powered by battery 29 which is carried on the frame 12 of the carriage 10, selonoid switches 31 and 32 are interposed between each motor and switch.

For both safety and control purposes, the power from the battery 29 to both switches 33 and 34 is applied by push button switch 36 which not only serves to prevent the carriage to operate unattended, but additionally allows a vehicle to be moved at the press of a button once the switches 33 and 34 are set in the selected position. For example, if it were desired to move the carriage 10 in a straight line, the switches 33 and 34 would both be set in a forward or reverse position depending on the desired direction. If a left or right turn were desired, only one motor or the other would be activated much in the same manner as a tank or tractor.

In order to cover and protect the drive train, a cover plate 35 is provided which also serves to provide the entire carriage-jack combination with a neat and intregal appearance and serves to provide a place to stand should an operator prefer to ride on the carriage rather than wald along with it when moving a vehicle.

In order to facilitate the charging of the battery 29 and to make the carriage-jack combination completely self contained, and intregal battery charger 30 is provided on the frame 12 of the carriage.

Having described my invention, I claim:

1. In a self powered carriage including jack means for moving immobile vehicles, the improvement comprising: the carriage comprising a frame for operative reception of a conventional wheeled hydraulic floor jack having jack non-caster forward load bearing wheels and rearward caster wheels, said frame having a forward end with a transversely extending recess to receive and support the front load bearing wheels of the jack in an inoperative restrained elevated position, said frame including a rearward end supported by the rearward caster wheels of the conventional wheeled jack, frame non-caster wheel means mounted on the forward end of said frame, said frame non-caster wheel means comprising a pair of wheels on opposite sides of said frame, means for selectively and independently powering each of said pair of wheels, said means for selectively powering said frame non-caster wheel means comprising at least one electric motor, a source of electric current connected to said motor with circuit interrupting means interposed therebetween, and power transfer means between said motor and said frame non-caster wheel means whereby upon the connection of electric current to said motor, the carriage will be self propelled.

2. The self powered carriage as set forth in claim 1, wherein said means for selectively powering said frame non-caster wheel means comprises at least one electric motor, a battery connected to said motor with circuit interrupting means interposed therebetween, and power transfer means between said motor and said wheel means whereby upon the connection of said battery to said motor, the carriage will be self propelled.

3. The self powered carriage as set forth in claim 1, wherein said means for selectively powering each said wheel comprises an electric motor operably connected to each wheel of said pair with each said motor being independently operable.

4. A self powered carriage adapted for use in combination with conventional wheeled hydraulic floor jack for moving immobile vehicles, said carriage comprising a frame adapted for operative reception of a conventional wheeled hydraulic floor jack having a jack non-caster forward load bearing wheels and rearward caster wheels, said frame having a forward end with a transversely extending recess to receive and support the front load bearing wheels of a jack in an inoperative restrained elevated position, said frame including a rearward end adapted to be supported by the rearward jack caster wheels of a conventional wheeled jack, frame non-caster wheel means mounted on the forward end of said frame, said frame non-caster wheel means comprising a pair of wheels on opposite sides of said frame, means for selectively and independently powering each of said pair of wheels, said means for selectively powering said frame non-caster wheel means comprising at least one electric motor, a source of electric current connected to said motor with circuit interrupting switch means interposed therebetween, and power transfer means between said motor and said frame non-caster wheel means whereby upon the connection of electric current to said motor, the carriage will be self propelled.

5. The apparatus as set forth in claim 4 wherein said frame non-caster wheel means include at least two wheels supporting the frame generally proximate to said jack means with said wheels each being independently driven by said motor means.

6. The apparatus as set forth in claim 4 further comprising battery means carried on said frame and connected to said motors with said switch means therebetween.

* * * * *